(12) United States Patent
Mizutani

(10) Patent No.: US 9,917,972 B2
(45) Date of Patent: Mar. 13, 2018

(54) IMAGE PROCESSOR, IMAGE-PROCESSING METHOD AND PROGRAM

(71) Applicant: Shigeo Mizutani, Kanagawa (JP)

(72) Inventor: Shigeo Mizutani, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/613,494

(22) Filed: Feb. 4, 2015

(65) Prior Publication Data
US 2015/0229876 A1    Aug. 13, 2015

(30) Foreign Application Priority Data
Feb. 13, 2014 (JP) ................................. 2014-025794

(51) Int. Cl.
*H04N 5/76* (2006.01)
*H04N 1/21* (2006.01)
*G06T 1/20* (2006.01)

(52) U.S. Cl.
CPC ............. *H04N 1/2112* (2013.01); *G06T 1/20* (2013.01); *H04N 5/76* (2013.01)

(58) Field of Classification Search
CPC .... H04N 1/2112; H04N 5/76; H04N 2101/00; H04N 2201/214; G06T 1/20
See application file for complete search history.

(56) References Cited

U.S. PATENT DOCUMENTS

| 6,873,658 | B2 * | 3/2005 | Zhou ......................... G06T 1/60 |
| | | | 348/231.99 |
| 8,350,927 | B2 * | 1/2013 | Kaimi ................ H04N 5/23248 |
| | | | 348/231.9 |
| 9,241,164 | B2 * | 1/2016 | Saito ..................... H04N 19/132 |
| 2006/0274940 | A1 | 12/2006 | Ozaki et al. |
| 2008/0174822 | A1 | 7/2008 | Kaimi et al. |
| 2009/0150697 | A1 * | 6/2009 | Yang ...................... G06F 1/3287 |
| | | | 713/323 |
| 2010/0260428 | A1 * | 10/2010 | Ueno ................... H04N 19/423 |
| | | | 382/232 |

FOREIGN PATENT DOCUMENTS

JP         4702233         3/2011
JP         2013-187630     9/2013

* cited by examiner

*Primary Examiner* — Twyler Haskins
*Assistant Examiner* — Carramah J Quiett
(74) *Attorney, Agent, or Firm* — Harness, Dickey & Pierce, P.L.C.

(57) ABSTRACT

An image processor executing a predetermined image process on an input image including a plurality of pixels to generate an output image includes an image-processing unit reading the input image required for generating the output image into an internal storing circuit as a reference image to execute an image process, a storing capacity determination unit determining whether or not a data size of the reference image is within a storing capacity range of the internal storing circuit, and a reference image division unit dividing the data size of the reference image when the data size of the reference image exceeds a storing capacity of the internal storing circuit by the storing capacity determination unit.

9 Claims, 5 Drawing Sheets

FIG.5
《INPUT IMAGE》 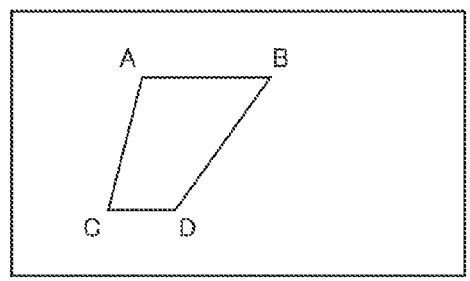
《OUTPUT IMAGE》 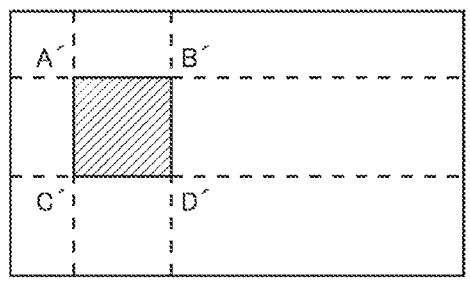
FIG.6
《NORMAL MODE》 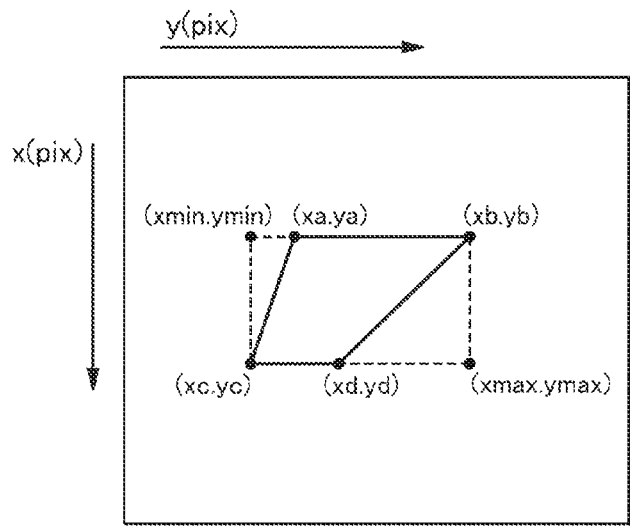
《OUTPUT IMAGE》 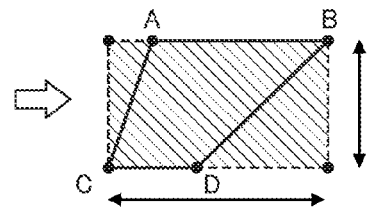

IMAGE PROCESSOR, IMAGE-PROCESSING METHOD AND PROGRAM

CROSS-REFERENCE TO RELATED APPLICATIONS

The present application is based on and claims priority from Japanese Patent Application Number 2014-025794, filed Feb. 13, 2014, the disclosure of which is hereby incorporated by reference herein in its entirety.

BACKGROUND

Field of the Invention

The present invention relates to an image processor, an image-processing method, and a program.

Description of the Related Art

It is known that a wide-angle lens such as a fish-eye lens has been used for video equipment, for example, a teleconference system or a monitoring camera. This is because such a wide-angle lens can provide a wide-angle image by a single lens.

The wide-angle lens has a large distortion rate at its edges due to a distortion property of a lens, and provides a distortional image. For this reason, it is known that an image process of correcting a distortion is often executed on an input image because a visibility of such an image is deteriorated.

As a method of achieving such an image process, a method of generating an output pixel by inputting a sub pixel value and a coordinate value of a corresponding input image with respect to each output pixel as deformation parameters, and performing interpolation calculation processes such as a bilinear interpolation process and a bicubic interpolation process to a specified input pixel is known.

Patent Literature 1 (JP 2013-187630A) describes an image processor which executes a distortion correction process with use of a reference parameter previously selected according to a region of a frame to be cut and stored in a reference parameter table memory, in order to improve process speed through a reduction in the number of accesses to an external memory by a reduction in reference parameter table capacity.

According to the image processor described in Patent Literature 1, the process speed of the distortion correction process can be improved.

DDR SDRAM (Double Data Rate Synchronous Dynamic Random Access Memory) is often used for a frame memory in which an input pixel obtained through a lens is temporally stored. However, the following problem occurs when a process of reading out an input pixel corresponding to an output pixel from DDR SDRAM is sequentially executed with respect to each output pixel. Namely, random access is executed to the DDR SDRAM, so that a significant process time is required. This problem becomes prominent especially in arbitrary image deformation.

On the other hand, there is a method of generating an output pixel by correction calculation. With this method, an output image is divided into a plurality of output image areas, and a part of a region (hereinafter referred to as reference image) of an input image required in each output image area is cut out, and the reference image is once loaded in a readable and writable SRAM (Static RAM) at high speed. After that, the output pixel is generated by the correction calculation.

However, the size of the reference image required for each output image area significantly differs due to the above-described distortion. For this reason, when the size of the reference image is large, such a reference image cannot be stored in a prepared SRAM. In this case, the correction is executed only with a part of an image stored in the SRAM, so that the quality of an output image after the correction is deteriorated.

SUMMARY

To solve the above problems, it is an object of the present invention to provide an image processor which executes an image process without deteriorating the quality of an output image.

To achieve the above object, an aspect of the present invention provides an image processor executing a predetermined image process on an input image including a plurality of pixels to generate an output image, the image processor including: an image-processing unit reading the input image required for generating the output image into an internal storing circuit as a reference image to execute an image process; a storing capacity determination unit determining whether or not a data size of the reference image is within a storing capacity range of the internal storing circuit; and a reference image division unit dividing the data size of the reference image when the data size of the reference image exceeds a storing capacity of the internal storing circuit by the storing capacity determination unit.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

FIG. 5 is a schematic view illustrating an image of generating the output image from the input image.

FIG. 6 is a schematic view illustrating an image of generating the output image from the input image in the embodiment of the present invention.

DETAILED DESCRIPTION OF THE PREFERRED EMBODIMENTS

Figure 1:
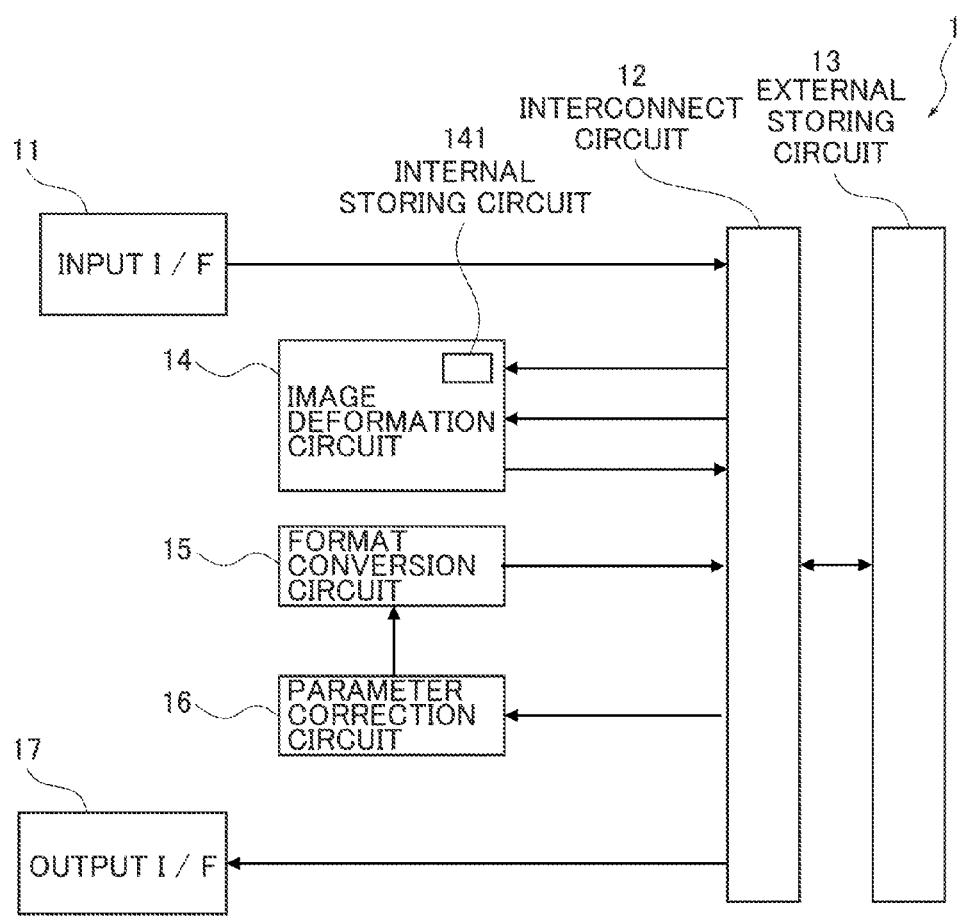
FIG. 1 is a block diagram illustrating a configuration of an image processor in an embodiment of the present invention.

Hereinafter, an image processor according to an embodiment of the present invention will be explained with reference to the drawings. However, the present invention is not limited to the present embodiment. It should be appreciated that variations may be made in the embodiment described by persons skilled in the art without departing from the scope of the present invention. In addition, the same reference numbers are applied to the same or corresponding portions in the drawings, and the duplicated description is appropriately simplified or omitted.

An image processor according to the present embodiment executes a predetermined image process on an input image including a plurality of pixels to generate an output image. The image processor according to the present embodiment executes an image process of generating a distortionless output image in which a distortion of an input image is corrected when generating the output image with the input image as a reference image. In this case, the image processor in this embodiment divides a data size of the reference image when the data size of the reference image exceeds a capacity of an internal storing circuit of an image-processing unit.

A schematic configuration of an image processor 1 in the embodiment of the present invention will be described with reference to FIG. 1. The image processor 1 according to the present embodiment includes an input interface (hereinafter referred to as input I/F) 11, an interconnect circuit 12, an external storing circuit 13, an image deformation circuit 14, a format conversion circuit 15, a parameter correction circuit 16, and an output interface (hereinafter referred to as output I/F) 17.

The input I/F 11 is an interface loading an input image photographed by an imaging unit such as a camera into the image processor 1. The output I/F 17 is an interface outputting an output image after an image process to an output device such as a display.

The interconnect circuit 12 is a data interface smoothly transferring data from each circuit to the external storing circuit 13, for example, prioritizing access of each circuit so as to prevent access competition from the after-described image deformation circuit 14, format deformation circuit 15, and parameter correction circuit 16 to the external storing circuit 13.

The external storing circuit 13 is a storing unit such as an HDD storing output image data, for example. A species parameter in which a distortion level generated in input image data is quantified is stored in the external storing circuit 13.

The image deformation circuit 14 is an image-processing unit reading an input image required for generating an output image into an internal storing circuit 141 as a reference image to execute an image process. The image deformation circuit 14 executes the image process with respect to each divided area obtained by dividing the output image into a plurality of areas. In the present embodiment, in view of high-speed data reading and writing, for example, SRAM is adopted as the internal storing circuit 141 built in the image deformation circuit 14.

The format conversion circuit 15 operates as a storing capacity determination unit determining whether or not the data size of the reference image is within a storing capacity range of the internal storing circuit 141. The format conversion circuit 15 determines whether or not the data size of the reference image is within the storing capacity range of the internal storing circuit 141 based on a correction parameter generated in the after-described parameter correction circuit.

The format conversion circuit 15 operates as a reference image division unit dividing the data size of the reference image when it is determined that the data size of the reference image exceeds the storing capacity of the internal storing circuit 141.

The parameter correction circuit 16 operates as a correction parameter generation unit generating a correction parameter correcting the input image based on an initial parameter of the input image and a deformation factor parameter in which an external factor or an internal factor deforming the input image in the input of the input image is quantified.

More particularly, the parameter correction circuit 16 reads out the species parameter as the initial parameter of the input image from the external storing circuit 13. The species parameter includes a parameter in which an appropriate distortionless input image is quantified, and a parameter in which a distortional input image is quantified.

The parameter correction circuit 16 executes parameter correction for the input image data based on the above-described external factor or internal factor such as heat, angle, or shift. The result of the parameter correction is transferred to the format conversion circuit 15.

The format conversion circuit 15 generates a deformation parameter according to a data format to be processed in the image deformation circuit 14 based on the corrected parameter. The generated deformation parameter is stored in the external storing circuit 13 through the interconnect circuit 12.

The image deformation circuit 14 reads out the deformation parameter stored in the external storing circuit 13 and a reference pixel stored in the deformation parameter to generate the output image. In this case, the area of the output image is divided, and the image deformation circuit 14 reads out the deformation parameter and the reference pixel by the area from the external storing circuit 13. After the image deformation circuit 14 completes the process of the output image in the area, the output image after the process is stored in the external storing circuit 13. The output image is completed by the completion of the image process of all areas.

In the above description, the format conversion circuit 15 stores the size information of the internal storing circuit 141 in the image deformation circuit 14. The format conversion circuit 15 obtains a deformation parameter from the external storing circuit 13, and determines whether or not the reference image can be stored in the internal storing circuit 141.

The format conversion circuit 15 executes a process of changing the data size of the reference image into the format of the image deformation circuit 14 when the format conversion circuit 15 determines that the data size of the reference image can be stored in the internal storing circuit 141. On the other hand, the format conversion circuit 15 executes a division process of the reference image to be processed in the image deformation circuit 14 based on the size information of the internal storing circuit 141 when the format conversion circuit 15 determines that the data size of the reference image exceeds the capacity of the internal storing circuit 141.

Figure 2:
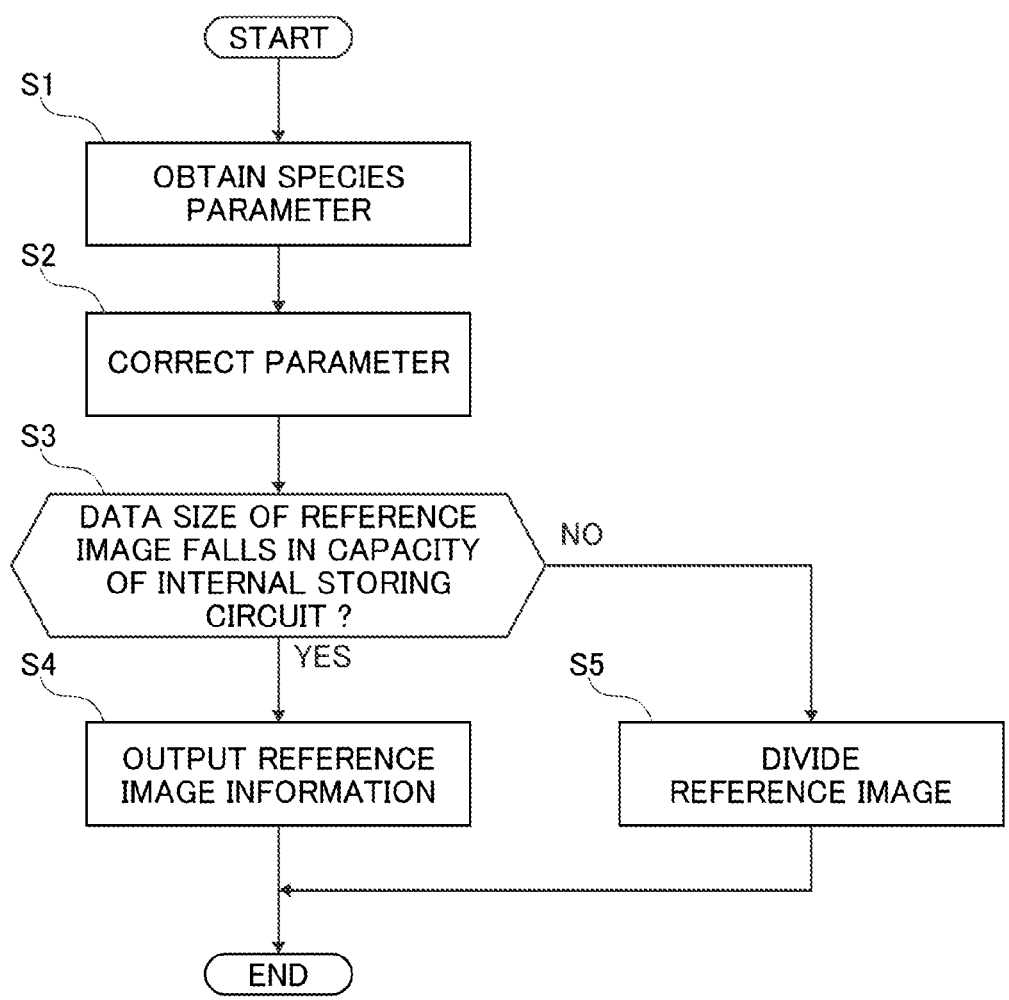
FIG. 2 is a flowchart illustrating a procedure of a reference image division process in the embodiment of the present invention.

Next, the procedure of the division process of the reference image in the present embodiment will be described with reference to FIG. 2. At first, the parameter correction circuit 16 obtains the species parameter stored in the external storing circuit 13 (Step S1).

Next, the parameter correction circuit 16 corrects a parameter based on a deformation factor parameter in which an external factor or an internal factor is quantified, and transfers the corrected parameter to the format conversion circuit 15 (Step S2).

After the corrected parameter is transferred, the format conversion circuit 15 determines whether or not the data size of the reference image for generating the output image with respect to each divided area can be stored in the internal storing circuit 141 of the image deformation circuit 14 (Step S3).

The format conversion circuit 15 outputs the deformation parameter according to the format of the image deformation circuit 14 when the format conversion circuit 15 determines that the data size of the reference image is a size which can be stored in the internal storing circuit 141 (YES in Step S3), and stores the deformation parameter in the external storing circuit 13 (Step S4).

On the other hand, the format conversion circuit 15 executes the division process of the reference image (Step S5) when the format conversion circuit 15 determines that the data size of the reference image is a size which cannot be stored in the internal storing circuit 141 (No in Step S3). Then, the format conversion circuit 15 outputs the deformation parameter according to the format of the image deformation circuit 14 after the division process, and stores the deformation parameter in the external storing circuit.

Through the image process in this embodiment, it becomes unnecessary to change, for example, the internal storing circuit according to the data size of the reference image in the image deformation circuit 14, and it becomes unnecessary to consider a chip size. Moreover, through the present embodiment, the quality of an output image can be prevented from being deteriorated.

In addition, the deformation parameters output from the format conversion circuit 15 to be stored in the external storing circuit 13 are the same with respect to both of the frame and the divided area. It is desirable to process by the frame, which accelerates the time of generating the deformation parameter because the number of accesses to the external storing circuit 13 can be reduced.

Figure 3:
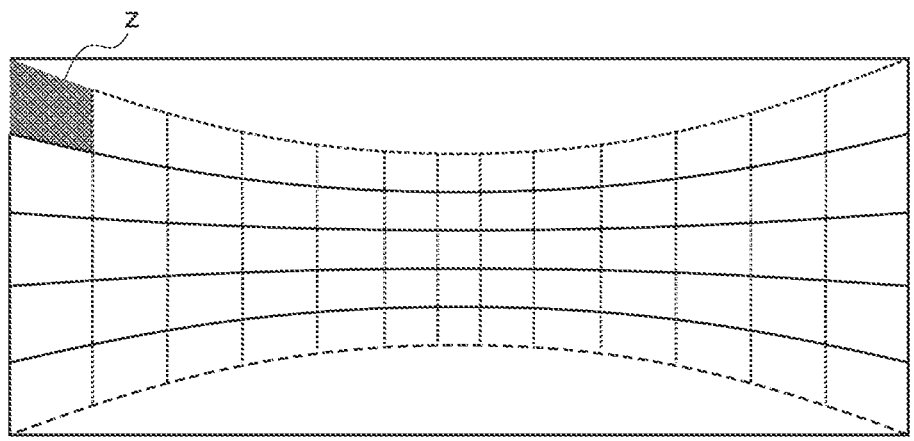
FIG. 3 is a schematic view illustrating an example of a distortional input image.

Next, an example of a distortional input image will be described with reference to FIG. 3. FIG. 3 illustrates that an image photographed by an imaging unit such as a camera includes a distortion at its edges due to a distortion property of a used fisheye lens. In this case, a distortional image Z generated in the upper left portion in FIG. 3 is focused.

Figure 4:
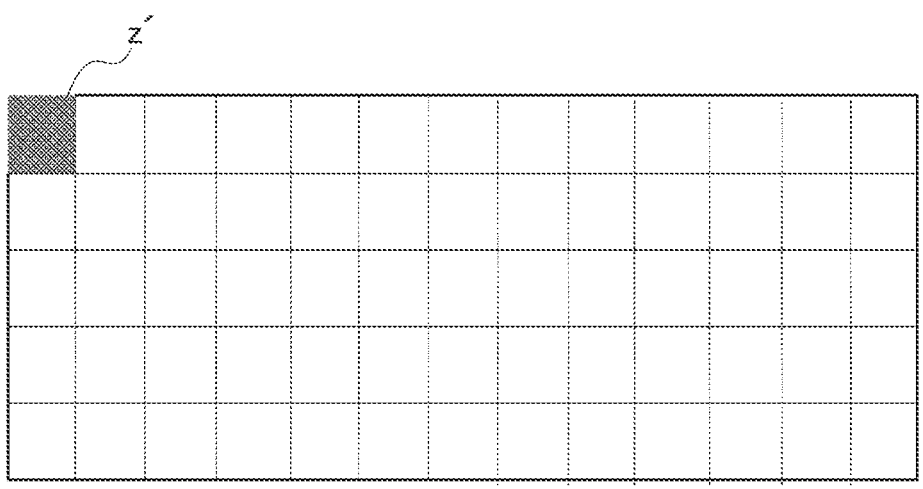
FIG. 4 is a schematic view illustrating an example of an output image in which a distortion is corrected.

FIG. 4 illustrates an example of an output image in which a distortion is corrected by the image deformation circuit 14 in the present embodiment. The distortional image Z in FIG. 3 is corrected to a distortionless image Z'. In the present embodiment, in order to obtain the distortionless image Z', the distortional image Z in FIG. 3 is specified as the reference image.

Next, an image for generating the output image from the input image will be described with reference to FIGS. 5, 6. The parameter correction circuit 16 reads the species parameter stored in the external storing circuit 13. The parameter correction circuit 16 generates an image of a region surrounded by A', B', C', and D' as illustrated in FIG. 5 as an output image area based on the deformation factor parameter such as a lens property difference or peripheral temperature data. The parameter correction circuit 16 therefore specifies the reference image region by outputting coordinates of four points A, B, C, and D in the input image as illustrated in FIG. 5.

The format conversion circuit 15 executes a calculation process of generating a deformation parameter based on the coordinate information of the reference image region transferred from the parameter correction circuit 16. The input image is stored in order in the external storing circuit 13 from the head of the frame of the image data. The image deformation circuit 14 therefore obtains data by a two-dimensional DMAC process, for example, and specifies a rectangular region as illustrated in FIG. 6. The rectangular region is specified because the process of specifying the region surrounded by the coordinates of the four points A, B, C, D becomes complex, and affects process speed. The rectangular region helps prevent such a problem.

In the present embodiment, for example, the x-direction and the y-direction are scanned for the two-dimensional DMAC process in FIG. 6. In addition, "pix" is abbreviation for a pixel, but it is only an example.

In the present embodiment, the image deformation circuit 14 calculates (xmin, ymin), (xb, yb), (xc, yc), (xmax, ymax) from the four points A, B, C, D in the input image. The image deformation circuit 14 calculates an offset address from the four points A, B, C, D for generating a rectangular region from the coordinate position (xmin, ymin), and obtains the reference image.

The image deformation circuit 14 calculates an offset address, and also calculates an image size surrounded by (xmin, ymin), (xb, yb), (xc, yc), (xmax, ymax). The image deformation circuit 14 thereby obtains the reference image for generating the output image surrounded by the dashed line as illustrated in FIG. 6.

The format conversion circuit 15 calculates whether or not the data size of the obtained reference image can be stored in the internal storing circuit 141 of the image formation circuit 14 by the following formulas. "Msize" in the following formulas 1, 2, 3 represents an allowable storing capacity of the internal storing circuit 141.

$$(x\mathrm{max}-x\mathrm{min})\times(y\mathrm{max}-y\mathrm{min})<M\mathrm{size} \qquad 1.$$

$$(x\mathrm{max}-x\mathrm{min})\times(y\mathrm{max}-y\mathrm{min})=M\mathrm{size} \qquad 2.$$

$$(x\mathrm{max}-x\mathrm{min})\times(y\mathrm{max}-y\mathrm{min})>M\mathrm{size} \qquad 3.$$

The format conversion circuit 15 executes a process according to the deformation parameter format of the image formation circuit 14 as described above when the format conversion circuit 15 determines that the reference image can be stored in the internal storing circuit 141 by the above formulas 1, 2.

On the other hand, when the format conversion circuit 15 determines that the data size of the reference image exceeds the allowable storing capacity of the internal storing circuit 141 by the above formula 3, the format conversion circuit 15 does not execute the process according to the deformation parameter format of the image formation circuit 14. This is because the reference image required for generating the output image becomes insufficient, and the influence on the image quality of the output image is increased.

Figure 7:
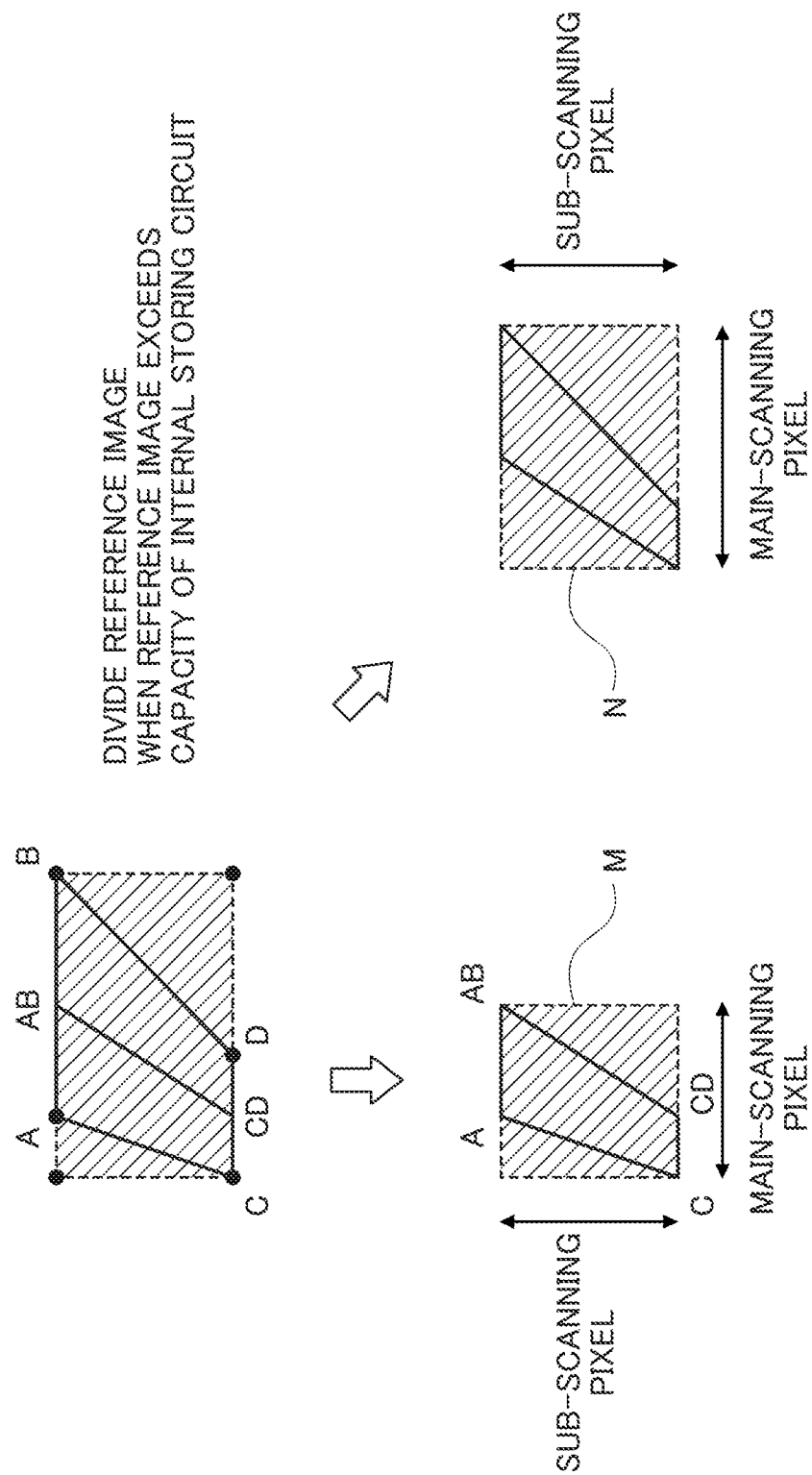
FIG. 7 is a schematic view illustrating a division process of a reference image in the embodiment of the present invention.

The format conversion circuit 15 executes the division process of the reference image illustrated in FIG. 7. At first, the format conversion circuit 15 calculates, for example, AB point as the middle point between A point and B point and CD point as the middle point between C point and D point.

The format conversion circuit 15 executes the division process of dividing the reference image region surrounded by the coordinates of the four points A, B, C, and D into a reference image region M of the four points A, AB, CD and C and a reference image region N of the four points AB, B, CD, and D.

The format conversion circuit 15 determines whether or not each region has a size which can be stored in the internal storing circuit 141 after the above two reference image regions are obtained. In addition, this process may be repeated until the reference image becomes a data size which can be stored in the internal storing circuit 141.

In this case, the divided two regions illustrate an example which can be stored in the internal storing circuit 141. The processes in each of the above-described formulas can be executed by calculating the offset address of each reference image region in which the external storing circuit 13 is stored. It is therefore unnecessary to change the allowable storing capacity of the internal storing circuit 141, and the output image can be prevented from being deteriorated.

Although the embodiment of the present invention has been described above, the present invention is not limited thereto. It should be appreciated that variations may be made in the embodiment described by persons skilled in the art without departing from the scope of the present invention. For example, each process in the image processor of the present embodiment can be executed with hardware, software, or a combined configuration of these.

When the process is executed with software, the program in which the processing sequence is recorded can be installed in a memory of a computer incorporated in dedicated hardware to be executed, or the program can be installed in a general computer which can execute various processes to be executed.

According to the embodiment of the present invention, the image process can be executed without deteriorating the quality of the output image.

What is claimed is:

1. An image processing device comprising:
memory storing computer-readable instructions; and
one or more processors configured to execute the instructions such that the one or more processors are configured to,
generate a reference image based on an input image, the input image including a plurality of pixels,
determine a data size of the reference image, and
when the data size of the reference image exceeds a storing capacity of a storing circuit,
divide the reference image into a plurality of divided reference image regions such that a data size of a first reference image region from among the plurality of divided reference image regions is a data size that does not exceed the storing capacity of the storing circuit,
store the first reference image region in the storing circuit, and
generate an output image by executing an image process on the stored first reference image region.

2. The image processing device according to claim 1, wherein the one or more processors are configured to execute the instructions such that the one or more processors are configured to execute the image process with respect to each area obtained by dividing the output image into a plurality of areas.

3. The image processing device according to claim 1, wherein the one or more processors are configured to execute the instructions such that the one or more processors are configured to generate a correction parameter correcting the input image based on a deformation factor parameter in which an external factor or an internal factor deforming the input image in input of the input image is quantified and an initial parameter of the input image.

4. The image processing device according to claim 3, wherein the one or more processors are configured to execute the instructions such that the one or more processors are configured to determine whether or not the data size of the reference image exceeds the storing capacity of the storing circuit based on the corrected parameter.

5. An image-processing method comprising:
generating a reference image based on an input image, the input image including a plurality of pixels;
determining a data size of the reference image; and
when the data size of the reference image exceeds a storing capacity of a storing circuit,
dividing the reference image into a plurality of divided reference image regions such that a data size of a first reference image region from among the plurality of divided reference image regions is a data size that does not exceed the storing capacity of the storing circuit,
storing the first reference image region in the storing circuit, and
generating an output image by executing an image process on the stored first reference image region.

6. A non-transitory computer-readable medium storing instructions that, when executed by one or more processors cause the one or more processors to:
generate a reference image based on an input image, the input image including a plurality of pixels,
determine a data size of the reference image, and
when the data size of the reference image exceeds a storing capacity of a storing circuit,
divide the reference image into a plurality of divided reference image regions such that a data size of a first reference image region from among the plurality of divided reference image regions is a data size that does not exceed the storing capacity of the storing circuit,
store the first reference image region in the storing circuit, and
generate an output image by executing an image process on the stored first reference image region.

7. The image processing device of claim 1 further comprising:
the storing circuit, the storing circuit being a static random access memory (SRAM).

8. The image-processing method of claim 5 wherein the storing circuit is a static random access memory (SRAM).

9. The non-transitory computer-readable medium of claim 6 wherein the storing circuit is a static random access memory (SRAM).

* * * * *